United States Patent [19]

Manno

[11] Patent Number: 4,811,365
[45] Date of Patent: Mar. 7, 1989

[54] COMMUNICATIONS SYSTEM

[76] Inventor: Phillip E. Manno, 1547 Tiffany Park Cir., Santa Maria, Calif. 93455

[21] Appl. No.: 928,203

[22] Filed: Nov. 7, 1986

[51] Int. Cl.$^4$ .......................... H04L 7/00; H04J 3/06
[52] U.S. Cl. ..................................... 375/107; 370/101; 370/103; 375/108; 375/109; 375/118; 375/120
[58] Field of Search ................ 328/120; 370/101, 103; 371/47, 62; 375/107, 108, 109, 118, 120; 380/48

[56] References Cited

U.S. PATENT DOCUMENTS

| 3,350,644 | 10/1967 | McNair | 375/118 X |
|---|---|---|---|
| 3,566,268 | 2/1971 | Webb | 375/109 |
| 3,969,582 | 7/1976 | van Duuren et al. | 375/108 X |
| 4,471,481 | 9/1984 | Shaw et al. | 370/101 X |
| 4,651,330 | 3/1987 | Ballance | 375/108 |

Primary Examiner—Stephen C. Buczinski
Assistant Examiner—Linda J. Wallace
Attorney, Agent, or Firm—Donald Streck

[57] ABSTRACT

An improvement to a communications system such as a satellite communications system, or the like, wherein a plurality of nodes transmit over a common path on a time sharing basis via a central hub. The method and apparatus permits closer spacing of the communications from the nodes on the path and eliminates wasted delay time. The method comprises designating one of the nodes as the reference node and the remaining nodes as slave nodes. A transmission sequence is begun by having the reference node transmit a repeating, pre-established, pseudo-random, digital sequence at a pre-established bit rate. The reference node continues its sequence, but then omits a portion between the start and end of the sequence. A slave node wishing to join the transmission sequence begins the same repeating, pre-established, pseudo-random, digital sequence at approximately the same pre-established bit rate and then starts transmitting an approximation of the portion of the sequence being omitted by the reference node. By adjusting the bit rate, phasing, framing and sequence portion of the transmission from the slave node until the portion being transmitted thereby exactly matches the portion being omitted by the reference node, the reference node and slave node are placed in precise synchronization. The slave node then informs the reference node that it is in synchronization and ready to begin normal message transmission. Normal message transmission is then begun by the reference and slave nodes. Since the slave nodes are in precise synchronization with the reference node and the length of each node's transmission is exact and pre-established, each node can precisely calculate the time at which to begin its transmission without need for delay between transmissions or the danger of overlap.

10 Claims, 8 Drawing Sheets

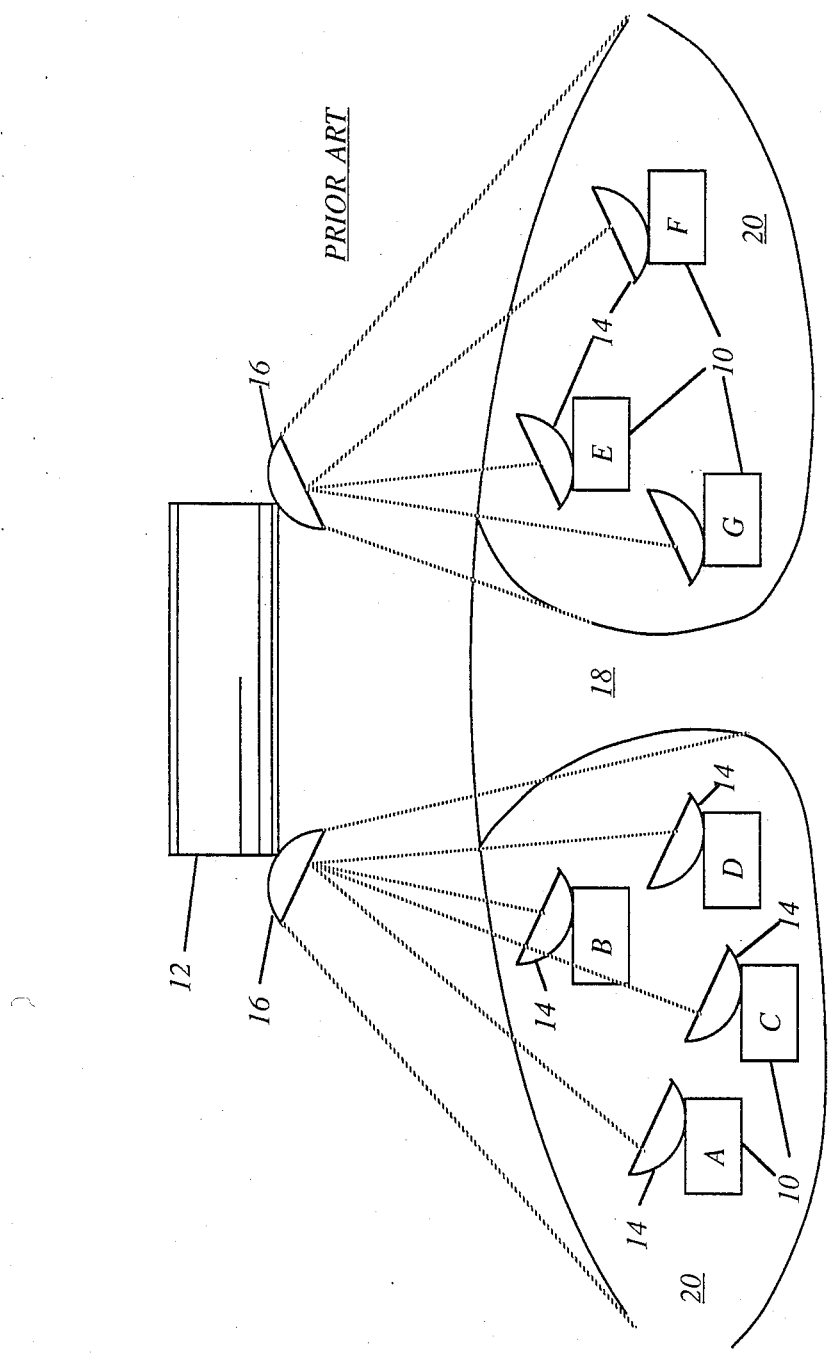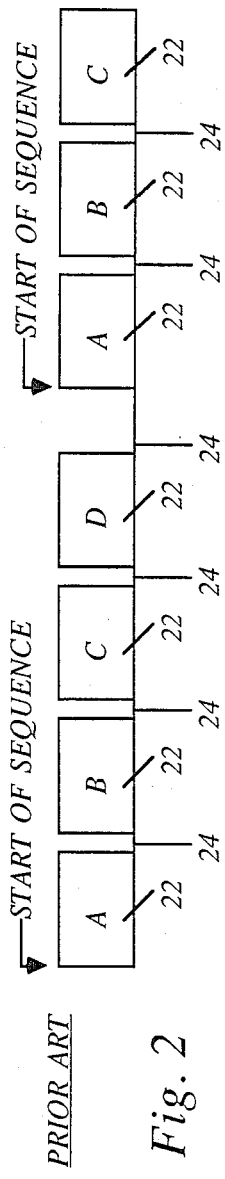

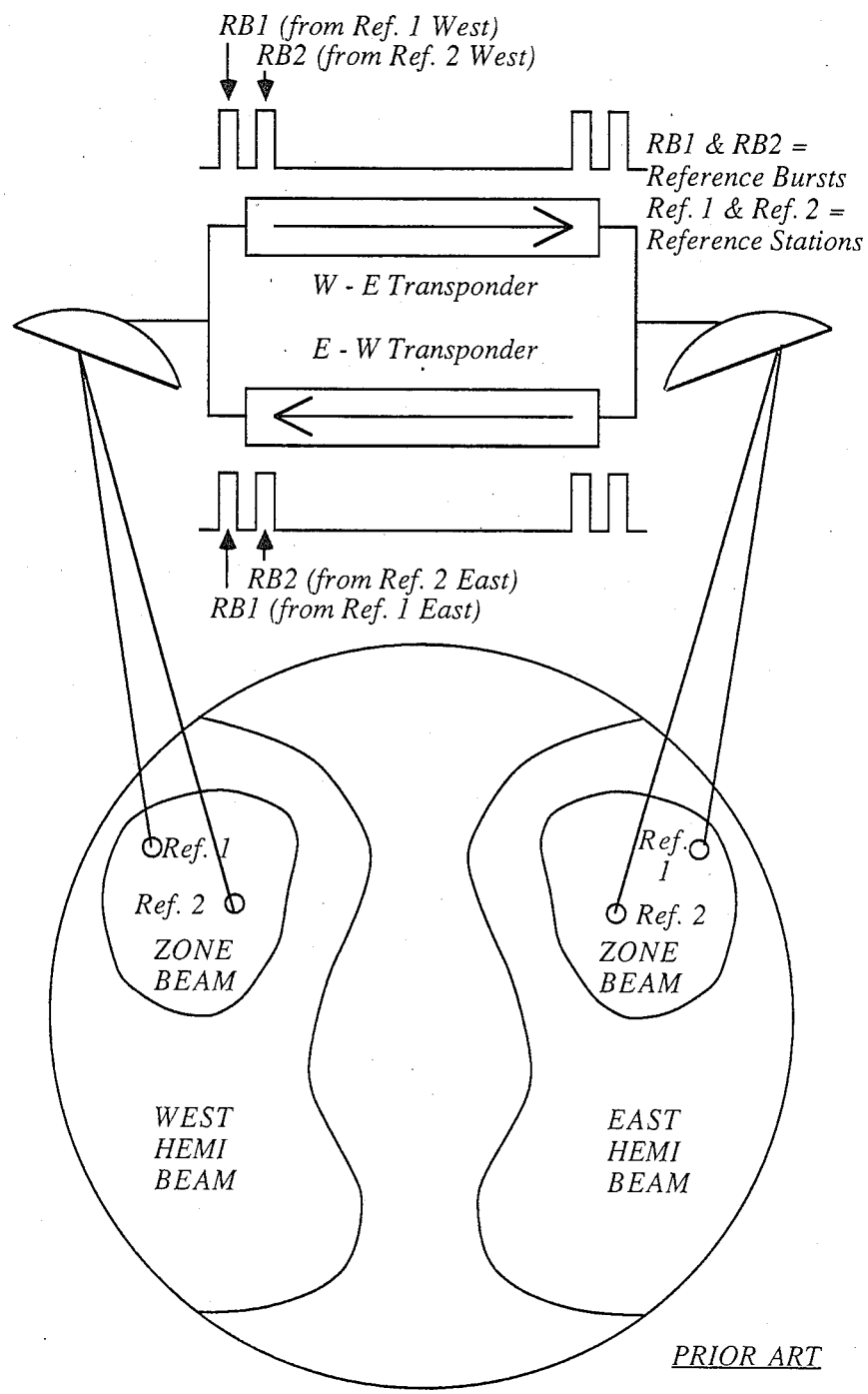
Fig. 3 — PRIOR ART

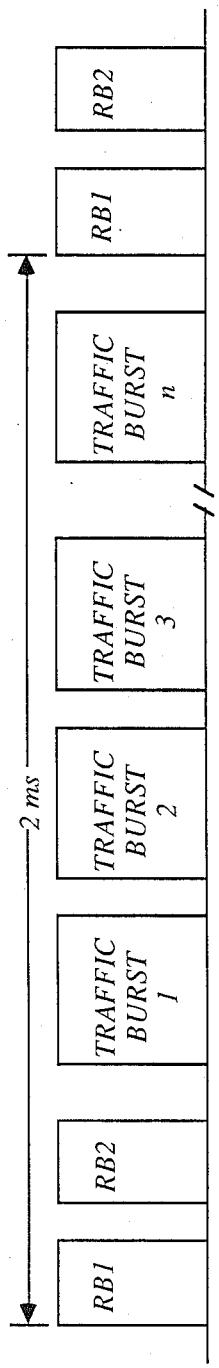
Fig. 4 PRIOR ART
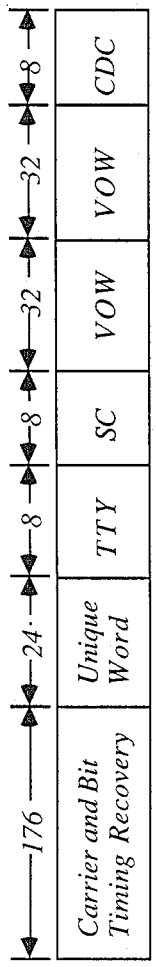
Fig. 5 PRIOR ART
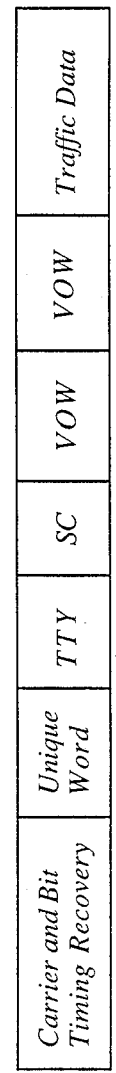
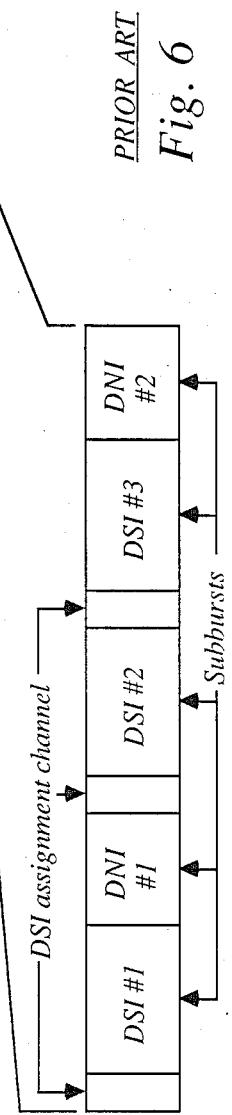
Fig. 6 PRIOR ART

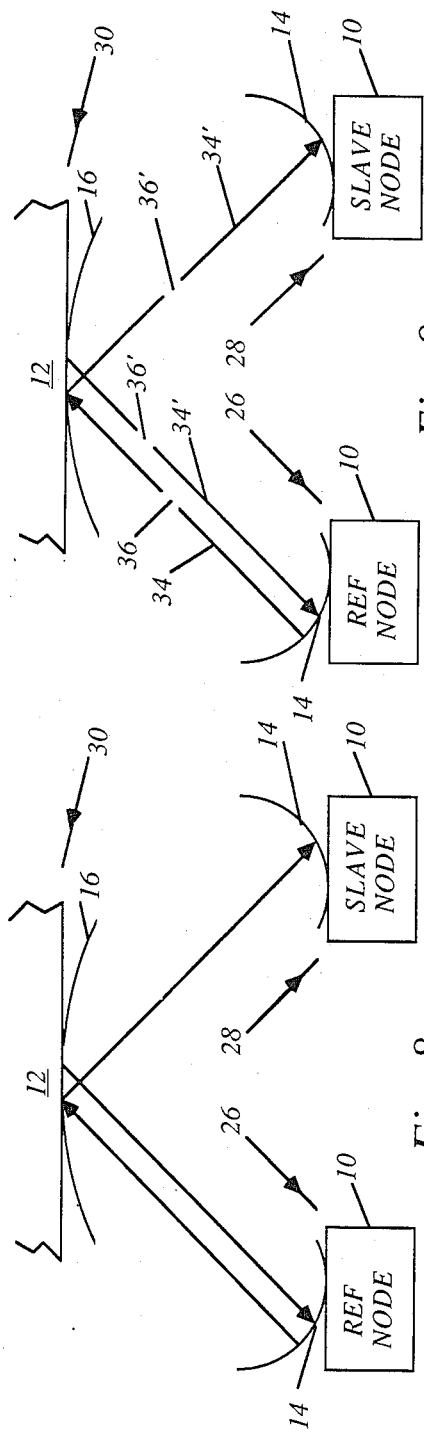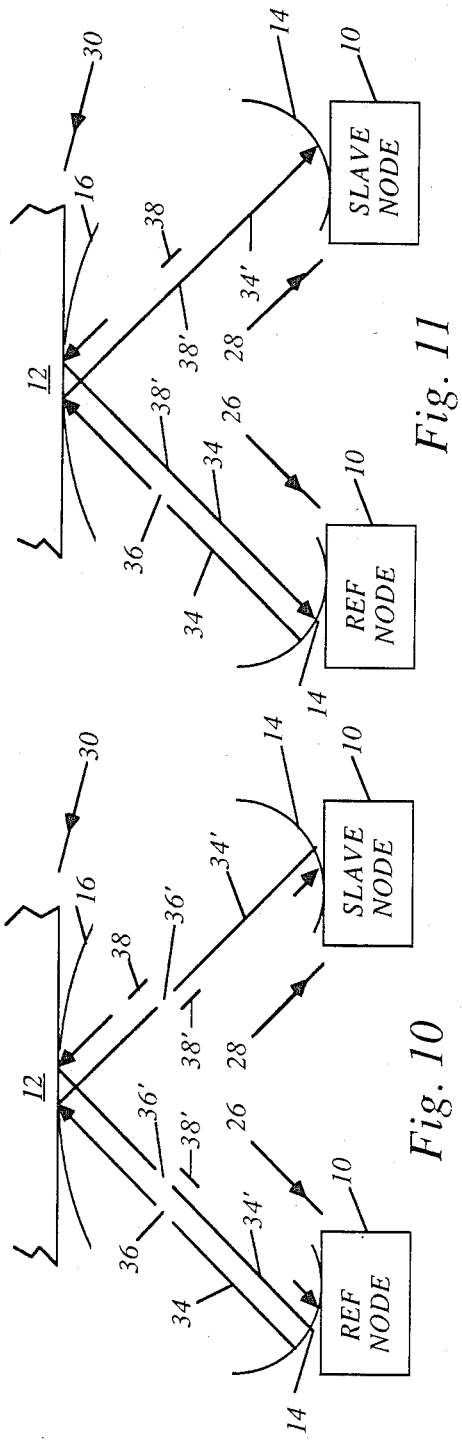

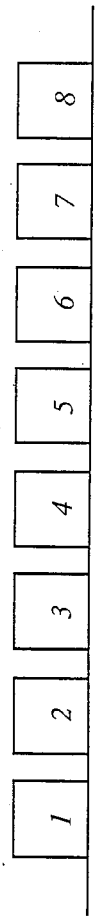
*Fig. 12*
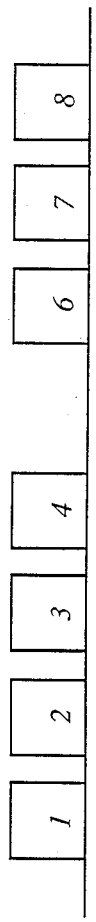
*Fig. 13*
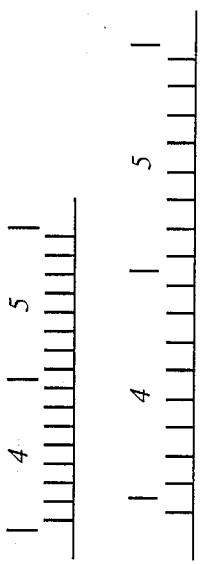
REFERENCE SIGNAL
SLAVE SIGNAL
SLAVE SIGNAL FREQUENCY MATCH
AND PHASE MATCH
SLAVE SIGNAL FRAME MATCH
AND SEQUENCE MATCH
*Fig. 14*

COMMUNICATIONS SYSTEM

BACKGROUND OF THE INVENTION

The present invention relates to communications systems and the like and, more particularly, to the improvement for permitting closer spacing of the communications from the nodes on the path of a communications system wherein a reference node and at least one slave node transmit over a common path on a time sharing basis via a common media to provide 100% utilization of that media, comprising, means for causing the reference node to transmit a unique signal at the start of a transmission sequence; means for the slave node to monitor the transmission from the reference node and for adjusting the bit rate, phasing, framing and sequencing of the slave node until the reference node and slave node are placed in precise synchronization; means for informing the reference node that the slave node is in synchronization and for beginning normal transmission from the reference node; and, means for causing the slave mode to begin its normal transmission immediately following the end of the normal transmission from the reference node without a delay therebetween.

In the discussion of the prior art and the present invention contained hereinafter, a satellite communications system is used as the point of reference and example. It is to be understood by those skilled in the art, however, that the invention described and claimed herein will work with and is applicable to any communications network including, but not limited to, computer networks, fiber optic communication systems, etc. Similarly, while a satellite communication system employing a satellite as a central hub or distribution point is described herein, the invention can be used with various communications network configurations well known in the art such as loop, star, hybrid, etc.

Communications systems are being used in ever-increasing popularity as more and more communications networks are placed into service. A typical satellite communications system is shown in simplified form in FIG. 1. There are a plurality of ground stations 10 which, for ease of identification, are labelled as "A" through "G". The ground stations all communicate through a single satellite 12. Each ground station 10 has an antenna 14 aimed at the satellite 12 and the satellite 12 has one or more antennas 16 each aimed towards the ground 18 and covering an area or footprint 20 on the ground 18 from which that antenna can receive transmissions and to which it can transmit. Communication via the satellite 12 is on a time sharing or time slicing basis. Thus, insofar as the present inventions and the benefits achievable thereby are applicable to other time slicing and time sharing environments and apparatus, it is the applicant's intent that they be included within the scope and spirit of this application, the specification, and claims thereof.

To say that a satellite for communications is expensive would be a gross understatement. Between the cost of the satellite itself and the cost of launching it into space by rocket, the cost of a single communications satellite in place and functioning is in the millions of dollars. This is all to say that, once in place, a prime goal is to maximize the utilization of the satellite. Any available time that is not used in the communications process represents wasted time and money.

The prior art time sharing use of communications satellites such as satellite 12 of FIG. 1 is depicted in the timing diagram of FIG. 2 taken in conjunction with the overall placement of the ground stations 10 and satellite 12 shown in FIG. 1. As any ground station 10 transmits to the satellite 12, the satellite 12 rebroadcasts what is being received back towards the footprint 20 on ground 18 from from one of its antennas 16. Thus, all ground stations 10 within the footprint 20 can receive the transmissions from any other ground station 10. It should be noted that a transmitting ground station 10 can receive its own transmission via the satellite 12 as well. Thus, for example, in the limited system of FIG. 1, when ground station "B" is transmitting, the retransmittion thereof from the satellite 12 can be received by ground stations "A", "B", "C", and "D". The same would be true with respect to stations "E", "F", and "G". While there is also transmission between footprints via the satellite 12, that is not of concern here.

In a prior art satellite communications system such as that of FIG. 1, all the ground stations 10 within a common footprint 20 are aware of the distance (in time) of each other station 10 from the satellite 12. Thus, any ground station 10 can predict the time that a transmission from any other station 10 will take to reach the satellite 12, be retransmitted, and reach the receiving station. This information is used to time slice the available time between the ground stations 10 as depicted in the diagram of FIG. 2. Each ground station 10 is allocated a fixed time duration for its transmissions within each overall time subdivision. For example, if the time subdivision of the satellite 12 were one second, each ground station 10 might be allocated the same fixed number of milliseconds in which to do its transmitting within each second. The actual times involved are much faster and the above numbers are just employed for purposes of the example. The order of transmission is fixed and each actual transmission includes a header block identifying the originating station 10 and the station or stations 10 for which the transmission is intended. This is very much like most computer-based time sharing and multiplexing schemes work. In this manner, each station 10 can identify the sequence of transmissions as received from the other stations 10 via the satellite 12. Since each station 10 knows the distance in time for the other stations 10 it can calculate the time at which it should begin and end its transmissions so as to fit properly within its allocated space in the time sequence.

As depicted in the time sequence of FIG. 2, however, the timing coordination of the prior art satellite communications systems is by approximation. There is a reference station 10 (for example station "A") which controls each transmission sequence. Each sequence is begun by the reference station and the remaining stations calculate their time slot after acquisition and lock-on to the originating signal from the reference station. As a result, in order to assure that each station 10 does not "step on" or transmit on top of the ending portion of the transmission from the station immediately preceeding it in the time sequence, a slight delay or buffer is allowed between the end of one station's transmission and the beginning of the transmission from the next. Thus, in FIG. 2 we see a transmission 22 from station "A" followed by a delay 24. Then, there is a transmission 22 followed by another delay 24, and so forth. While these delays 24 are of short duration, they still represent a series of lost times within each time sequence. The more individual stations 10 are transmitting within each time sequence, the more individual delays 24 there are and the more total time is lost to delays. Additionally, the acquisition sequence must be repeated for each transmission sequence.

The INTELSAT TDMA/DSI System is the most commonly known prior art example of the environment wherein the present invention is applicable. By way of providing a complete background with respect to the prior art in edited form, the following description is included herein. It is a condensed version of that contained in the "Reference Manual for Telecommunications Engineering" and is, in turn, extracted from Pontano, Dicks, et al., "The INTELSAT TDMA/DSI System" from INTELSAT, Washington, DC.

The earth segment of the INTELSAT/DSI system comprises four reference stations per satellite and a number of traffic terminals. The system operates with satellites having four coverage areas (east hemispheric beam, west hemispheric beam, east zone beam and west zone beam). Normally, zone beam coverage areas will also be contained within hemispheric beam coverage areas. Zone and hemispheric beams use opposite senses of polarization. FIG. 3 shows a satellite with typical east-to-west and west-to-east connectivities of both the zone and hemispheric beams. Two dual polarized reference stations located in each zone coverage area are thus able to monitor and control both zone and hemispheric beam transponders. Each reference station generates one reference burst per transponder and each transponder will be served by two reference stations. This provides redundancy by enabling traffic terminals to operate with either reference burst. The two pairs of reference stations provide network timing and control the operation of traffic terminals and other reference stations.

Reference stations include a TDMA system monitor (TSM) which is used to monitor system performance and diagnose system faults. In addition, the TSM is used to assist users in carrying out their traffic terminal line-ups.

The traffic terminals operate under control of a reference station and transmit and receive bursts containing traffic and system management information. Traffic terminals contain interfaces which are used to connect the terminals to the terrestrial networks. The TDMA/DSI system uses two types of interfaces: digital speech interpolation (DSI), which accommodates voice traffic (together with a limited amount of nonvoice traffic), and digital noninterpolated (DNI), which accommodates data and noninterpolated voice traffic.

System Features

Four-phase coherent phase-shift keying (CPSK) modulation without differential encoding is employed at a nominal bit rate of 120.832 Mbit/s;

Forward Error Correction (FEC) is applied to the traffic portion of selected traffic bursts;

Open loop acquisition and feedback closed loop synchronization for traffic and reference terminals;

Burst time plan rearrangement can be made automatically without loss of traffic;

Each pair of reference stations can control up to 32 terminals including other reference stations;

Each traffic terminal can transmit up to 16 bursts and receive up to 32 bursts per frame;

Each traffic terminal can transponder hop across up to 4 transponders;

Digital Speech Interpolation interface can be applied in channel grouping of up to 240 terrestrial channels; and Plesiochronous interconnection to the terrestrial network can be provided. [Note with respect to the present invention that this "feature" is directed to the correction of a slow drift of the signals from the various sources with respect to time which is eliminated by the invention described hereinafter.]

Reference Station Functions

Perform satellite position determination needed for acquisition;

Provide open loop acquisition information to traffic terminals and other reference stations;

Provide synchronization information to traffic terminals and controlled reference stations;

Provide TDMA System Monitoring;

Provide network management by transmitting the appropriate messages or codes to traffic terminals and other reference stations;

Provide common synchronization across multiple satellite transponders (permitting transponder hopping);

Provide voice and teletype order wires; and

Provide access to the INTELSAT Operations Center (IOC) for network voice and teletype order wires and for transmittal of status information.

Traffic Terminal Functions

Perform acquisition and synchronization under control of a reference station;

Generate and receive bursts containing traffic and housekeeping information;

Perform transponder hopping where necessary;

Under the coordination of the reference station, carry out synchronous burst time plan changes; and Provide voice and teletype order wires.

Burst and Frame Format

The frame contains traffic bursts and the reference bursts RB1 and RB2 as shown in FIG. 4. Each reference burst is transmitted by a separate reference station and, under normal conditions, both reference stations are active. One station is designated a primary reference station, the other a secondary (backup) reference station. The traffic terminals respond to the secondary reference station only when the primary reference station fails. The nominal guard time between bursts is 64 symbols.

FIG. 5 shows the reference and traffic burst formats. The reference burst consists of a preamble and a control and delay channel (CDC). The traffic burst consists of the preamble and a traffic section consisting of one or more DSI and/or DNI subbursts. The preamble includes the carrier and bit timing recovery sequence, the unique word, the teletype order wire channels, the service channel, and the voice order wire channels.

The carrier and bit timing recovery sequence is designed to enable the modem to acquire and synchronize to receive bursts. The 24 symbol unique words are used to differentiate reference bursts and traffic bursts, resolve the four-fold phase ambiguity inherent in QPSK modulation, and mark the beginning of a multiframe. Eight teletype order wires and two voice order wires are allocated eight symbols and 64 symbols, respectively, in each reference burst and traffic burst. Eight symbols form a service channel which is used to exchange control and housekeeping information throughout the TDMA network. Finally, in the reference burst, eight symbols are allocated for the control and delay channel (CDC), which is used to control the traffic terminal s acquisition and synchronization.

Unique Words

The 24 symbol unique word contains two consecutive 12 symbol patterns which serve three purposes. The last symbol of a word marks the position of a burst relative to the start of the frame. Next, the pattern of the first 12 symbols is used to resolve the four-fold phase ambiguity. Finally, the pattern of the second 12 symbols relative to the first is an identifier used to distinguish between reference bursts and traffic bursts. For 15 consecutive frames, all bursts use the same identifier (UWO) but on the 16th burst (called a multiframe marker), the identifier changes to identify the burst as RB1, RB2, or a traffic burst. A multiframe is defined as the 16 frames starting with the multiframe marker. FIG. 6 shows the multiframe format.

Service Channel

A service channel message consists of a 8 bit function code, a 22 bit parameter, and a 2 bit parity check. This word is transmitted over one multiframe (16 TDMA frames) at a rate of 2 bits/frame. For redundancy, each bit is repeated 8 times in every burst.

Control and Delay Channel

The CDC cyclically addresses each controlled traffic terminal and reference station in successive multiframes using a 32 multiframe cycle referred to as a control frame. Transmission of a 32 bit CDC message is accomplished in a manner similar to the service channel message. The structure of the 32 bit CDC message is shown in FIG. 7. Except for terminal number 0, which is used for reference station status codes and the burst time plan number, each message is destination directed to the particular terminal identified by the terminal number. The destination directed messages control terminal operation by means of a 2 bit control code and a 22 bit word providing the transmit delay.

Acquisition and Synchronization

Acquisition is the process by which a TDMA terminal initially places its burst into the assigned position within the TDMA frame. This process must be executed without interference to other bursts in the frame. A terminal may enter the acquisition phase if it receives, via the CDC, an acquisition control code from the reference station together with a value of transmit delay. The transmit delay is the time between the reception of a reference burst and the transmission of the acquiring terminal's own burst. The reference station calculates the value of the transmit delay based upon a knowledge of satellite position. This method is referred to as "open loop" acquisition.

During the acquisition process, the terminal transmits only its preamble (short burst). The reference station measures the position of the short burst within the frame and transmits a new value of delay which causes the short burst to move to its nominal position. When the reference station has verified that the short burst is in its nominal assigned position, it transmits the "synchronization" code to the terminal. The reception of the "synchronization" code notifies the terminal that the acquisition phase is complete and that traffic subbursts can be added to the preamble.

Synchronization is the process by which bursts are maintained in their assigned positions within the frame. The reference station monitors the position of the burst in the frame and continuously modifies the transmit delay values to maintain their bursts in their proper positions. This process is referred to as "feedback closed loop" synchronization.

The ratio of the number of terrestrial channels to the number of satellite channels to be employed by each DSI unit in the system will be set such that competitive clipping lasting more than 50 ms will occur on less than 2 percent of the voice spurts. In order to meet this requirement while maximizing satellite capacity, the DSI units employ bit reduction. When the number of simultaneously active terrestrial channels exceeds the number of satellite channels allocated for the DSI unit, additional satellite channels can be derived by "stealing" the least significant bit of the 8 bit voice channels. These overload channels are used to prevent "freeze out" when no satellite channel is available for an active terrestrial channel. This process reduced the affected satellite channels from 8 bits to 7 bits during periods of overload.

Terrestrial Interfaces

The INTELSAT system uses the plesiochronous method for interconnecting national digital networks. This requires that national digital networks be interconnected by means of buffers sized to accommodate the surplus or deficiency of bits arising from the difference in bit rates between the two networks. This is accomplished by repeating a block of PCM bits if the buffer is approaching exhaustion, or deleting a block if the buffer is full. These blocks are chosen to be PCM frames since deleting or repeating PCM frames (termed "slipping") will not cause a significant disturbance to the network. [Again note that the present invention eliminates the difference in bit rates and, therefore, makes the adjustments implemented in the INTELSAT system unnecessary.]

To further limit the disturbance, slipping is only allowed every 72 days. This in turn dictates that the national networks and the TDMA frame rate must beheld to within one part in $10^{11}$ of their design frequencies over 72 days. This necessitates that one reference station derives its frame timing from a high stability clock which provides the time reference for the TDMA network.

Plesiochronous interfacing of the TDMA terminals also requires Doppler buffers to remove path length variations caused by satellite movement. The TDMA/DSI system buffers are able to accommodate up to 1.1 ms of peak-to-peak path length variation.

Burst time Plan

A burst time plan for the INTELSAT system will contain all the operational parameters for all the terminals in the network. Each burst time plan (BTP) is represented by a unique number, and current time plan number verification is part of a terminal's acquisition procedure. Thus, whenever a change in burst time plan occurs, all stations must be updated.

Burst Time Plan rearrangement

The INTELSAT TDMA/DSI system provides fully synchronous burst time plan rearrangements. This involves changing the position and/or length of some or all bursts within the frame of any TDMA transponder.

Immediately prior to the implementation of a new burst time plan, the controlling primary reference station will send "start of plan change" to the primary in the other coverage area. After an appropriate delay which synchronizes the messages, both reference stations will send a "request for ready to change" message to the terminals over the service channel. This message will activate a facility which permits the terminal to react to a countdown signal. When this facility is activated, the terminal transmits a "ready to change" signal over the service channel. When both reference stations have confirmed that all terminals involved in the time plan change are enabled and the new time plan has been correctly placed in the background memories of the terminals concerned, the reference stations declare "ready to change." To inform the controlling reference station that it is ready to change, the reference station sends a message over the service channel for one second. When the controlling primary station receives this message, it declares "ready to initiate countdown". The controlling reference station sends "initiate countdown" to the other reference station and after delays necessary to synchronize the countdown, both stations send "notification of time plan change" to all terminals using a countdown sequence over the service channel. When terminals receive the final countdown message, they adopt the new transmit time plan on the next transmitted frame, while on the receive side, the plan is adopted 12 multiframes after the final message. This results in a synchronized system-wide change without interruption to the network.

From the foregoing description, it can be seen that the most up to date prior art approach to time slicing of communications through a central point such as in satellite communications is a complex procedure which wastes much valuable time and money.

Wherefore, it is the object of the present invention to provide a communications system operating on a time sharing basis wherein there is no delay between the transmissions from suceeding stations such that the time sequence of the system is virtually 100% utilized in a useful manner.

It is a further object of the present invention to provide a satellite communication system wherein once the various ground stations utilizing the satellite of the system are placed in lock with the other stations in the system, further relocking procedures are unnecessary until there is a change in the system.

SUMMARY

The foregoing object has been achieved in a communications system wherein a plurality of nodes transmit over a common path on a time sharing basis via a central hub by the improvement for permitting closer spacing of the communications from the nodes on the path comprising: means for designating one of the nodes as the reference node and the remaining nodes as slave nodes; means for beginning a transmission sequence by having the reference node transmit a repeating, pre-established, pseudo-random, digital sequence at a pre-established bit rate; means for having the reference node continue its the sequence omitting a portion between the start and end of the sequence; means for having a slave node wishing to join the transmission sequence begin the same repeating, pre-established, pseudo-random, digital sequence at approximately the same pre-established bit rate; means for having the slave node transmit an approximation of the portion of the sequence being omitted by the reference node; means for adjusting the bit rate, phasing, framing and sequence portion of the transmission from the slave node until the portion being transmitted thereby exactly matches the portion being omitted by the reference node whereby the reference node and slave node are placed in precise synchronization; and, means for having the slave node inform the reference node that it is in synchronization and ready to begin normal message transmission and for beginning normal message transmission by the reference and slave nodes.

DESCRIPTION OF THE DRAWINGS

FIG. 1 is a simplified drawing of a common prior art satellite communicatations system.

FIG. 2 is a simplified drawing of the prior art manner of transmitting data via a satellite.

FIG. 3 is a simplified drawing of the INTELSAT approach to satellite communications.

FIG. 4 is a drawing showing the INTELSAT frame containing traffic bursts and reference bursts RB1 and RB2.

FIG. 5 is a drawing showing the INTELSAT reference and traffic burst formats.

FIG. 6 is a drawing showing the INTELSAT multiframe format.

FIGS. 8–11 are simplified drawings showing the basic principle of the present invention.

FIG. 12 is a simplified drawing showing a very basic numerical sequence.

FIG. 13 is a simplified drawing showing the sequence of FIG. 12 adapted to the purposes of the present invention.

FIG. 14 is a simplified drawing illustrating the various aspects of the signals that must be synchronized to accomplish the objectives of the present invention.

DESCRIPTION OF THE PREFERRED EMBODIMENT

Figure 7:
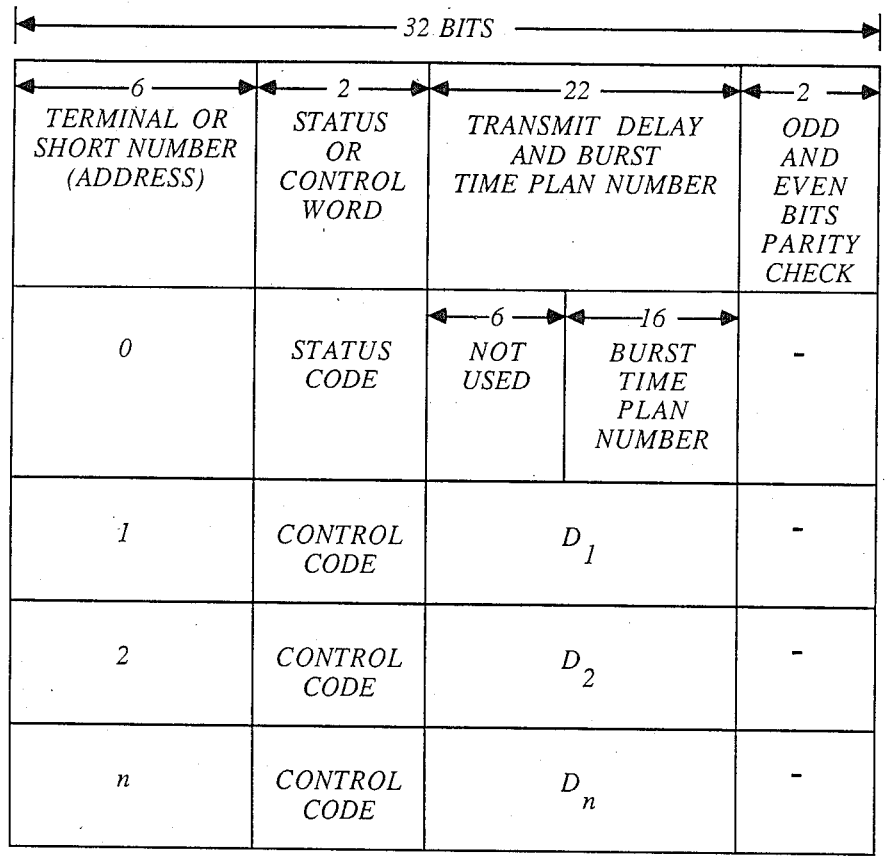
FIG. 7 is a drawing showing the structure of the INTELSAT 32 bit CDC message.

While the present invention is primarily intended for use with fiber optic and satellite communications systems, as mentioned earlier, other similar environments and equipment will find benefit from the teachings contained herein even though the description contained herein is directed to a satellite communications system by way of example and the claims which follow that description may address a satellite communications system with particularity. For this reason, it is applicant's intent that where the term satellite communications system and terms related to such a system are utilized in the following claims in the interest of specificity for purposes of the requirements of 35 USC 112, the language of those claims be considered as covering related equipment and the manner of operation thereof which subsequently employ the present invention to obtain the benefits thereof. In the description hereinafter, the broader term "node" will be employed to indicate the various stations, and the like, which are doing the communicating and the term "hub" will be used to indicate the satellite, or the like, at the center or distribution point of the common communications path.

The basic principle upon which the present invention is founded is the placing of the various nodes in such precise and exact synchronization that, knowing the pre-established times and order of the transmissions, each node can precisely and exactly calculate the time at which to start its transmission so as to begin at the instant the transmission from the node previous in the sequence ends—without either delay or overlap.

Turning now to FIGS. 8–11, the technique of the present invention is demonstrated in simplified form. For purposes of example, only two nodes are shown. In each case, there is a single reference node, generally indicated as 26, and a balance of slave nodes, generally indicated as 28, communicating through a hub, generally indicated as 30. As demonstrated by FIG. 8 and as described above with respect to the prior art, the communications system is such that a transmission 32 from the reference node 26 to the hub 30 is retransmitted as transmission 34 which is received by both the reference node 26 and the slave node 28. It should be noted at this point that the nodes 26, 28 can communicate with one another in a manner well known in the art which forms no part of the present invention. Hereinafter when the description states that one node signals the other, it is to be understood that it is via this alternative communications path.

Turning now to FIG. 9, when it is intended by or requested of the reference node 26 that it begin an acquisition sequence whereby slave node 28 can become synchronized in the manner to be described, the reference node 26 begins transmitting a pre-established and known digital sequence 34 containing a gap 36 therein. The hub 30 retransmits the sequence 34' containing the gap 36', which is received by both the . nodes 26, 28 in the usual manner. The slave node 28 first locks onto the sequence 34' and adjusts its internal clocking mechanism to place the slave node 28 in generally in bit rate and phase synchronization with the received sequence 34'. It then finds the frame limits of the sequence.

Once the frame limits of the sequence have been established, the slave node 28 start generating internally the same pre-established and known digital sequence (as 34 above) and attempts to place it generally in sequential synchronization with the received sequence 34'. Once this is accomplished, as shown in FIG. 10, the slave node 28 begins transmitting just the portion 38 of the sequence which correspond to the gap 36, 36' of the reference node's transmission. Portion 38, of course, is retransmitted as 38' to be received by both nodes 26, 28. By adjusting its internal parameters, the time orientation of the transmitted portion 38 is adjusted until the two received signals 34' plus 38' form the entire pre-established and known digital sequence without the gap. Once this is achieved, the slave node 28 is precisely and accurately synchronized with the reference node 26. At that point the slave node 28 can signal the reference node 26 that it is in synchronization and normal communications through the hub 30 can commence. Being in exact synchonization from all aspects (i.e. bit rate, phasing, and framing) the slave node 28, which has prior knowledge of the message sequencing, time allotments, and time/distance factors for each node on the communications system, can calculate exactly when to begin its transmission.

Turning first briefly to FIGS. 12–14, the specifics of how the present invention works in its preferred embodiment will now be addressed. FIG. 12 shows in simplified form a very basic numerical sequence which could form the basic pre-established sequence used in the synchronization process. FIG. 13 shows how the two transmissions 32 and 38 might appear if the sequence of FIG. 12 were employed. In such case, the single number "5" would be the gap 36. FIG. 14 shows in simplified form what must be accomplished to place the nodes in precise and exact synchronization; that is, the slave signal must be placed in frequency (i.e. bit rate), phase, frame, and sequence synchronization with the reference signal.

Figure 15:
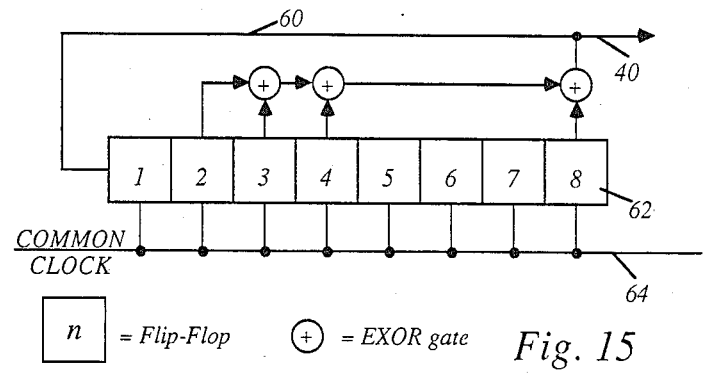
FIG. 15 is a drawing of a basic pseudo random number generator as incorporated into the present invention.

FIG. 15 shows a circuit as employed in the preferred embodiment of the present invention for generating the pre-established sequence in both the reference and slave nodes. The circuit is one of many which are well known in the art and, per se, forms no part of the novelty of the present invention. As will be recognized by those skilled in the art, the circuit of FIG. 15 outputs a pseudo random number sequence on its output line 40. In this manner, each node can quickly and easily generate the same pre-established sequence as necessary. This will be returned to shortly.

Figure 16:
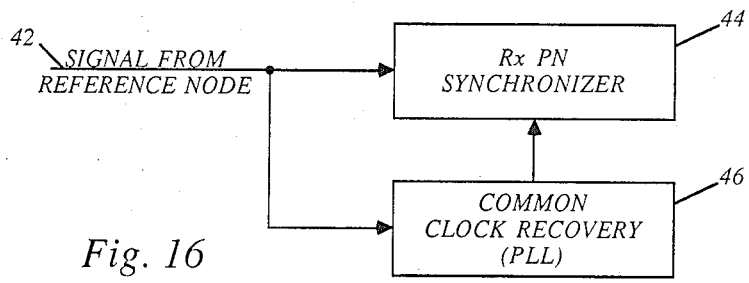
FIG. 16 is a block diagram showing the manner of clock synchronization by phase locked loop employed in the present invention.

Turning briefly to FIG. 16, the approach used to provide frequency synchronization is shown in block diagram form to avoid redundancy. Again, these techniques are well known to those skilled in the art and form no part of the novelty hereof per se. The received signal 34', from the reference node is input on line 42 to a receive (Rx) synchronizer circuit 44 and a common clock recovery circuit 46 which employs phase locked loop technology to place the clock signal within the slave node 28 in synchronization with the clock of the reference node 26 in the usual manner.

Figure 17:
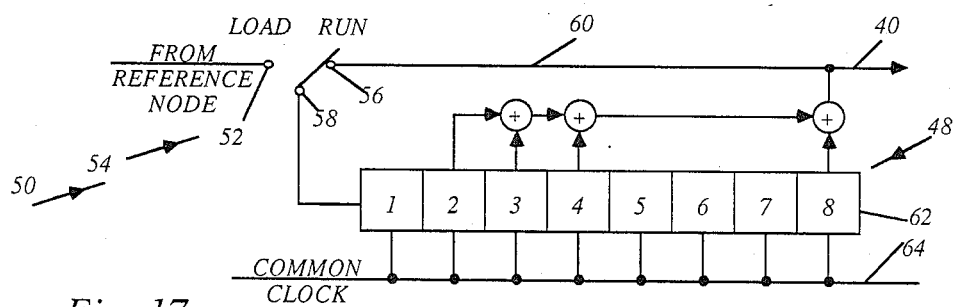
FIG. 17 is a drawing of a circuit incorporating the circuit of FIG. 15 as employed to place the pseudo random number sequences in the reference node and a slave node in approximate synchronization.

Turning now to FIG. 17, the basic pseudo random generator circuit 48 of FIG. 15 is shown incorporated into a circuit 50 by which the slave node 28 is placed in approximate sequence synchronization with the reference node 26. The received signal 34' on input line 42 also appears at one selectable terminal 52 of a two-position switch 54. The other terminal 56 and moving contact 58 of the switch 54 re inserted in series with the feedback loop 60 of the basic circuit of FIG. 15. As a result, when switch 54 is in its "RUN" position as shown in FIG. 17, the circuit 50 will output the pseudo random number sequence on output line 40. When switch 54 is switched to the "LOAD" position, however, the received signal 34' is input to and shifted through the flip-flops 62 thereof. To start approximate "lock-on" to the received signal 34' from the reference node 26, the switch 54 is switched to the "LOAD" position which causes the circuit 50 to begin merely shifting the received signal 34' therethrough. When switch 54 is then switched to its "RUN" position, it continues with the pseudo random number sequence on its own beginning at the same place as the received signal 34' was at that point in time. Since the recovered clock driving the circuit 50 on line 64 has been placed in synchronization with the clock of the reference node by the circuit of FIG. 16, the two pseudo random sequences continue independently in close approximation.

Figure 18:
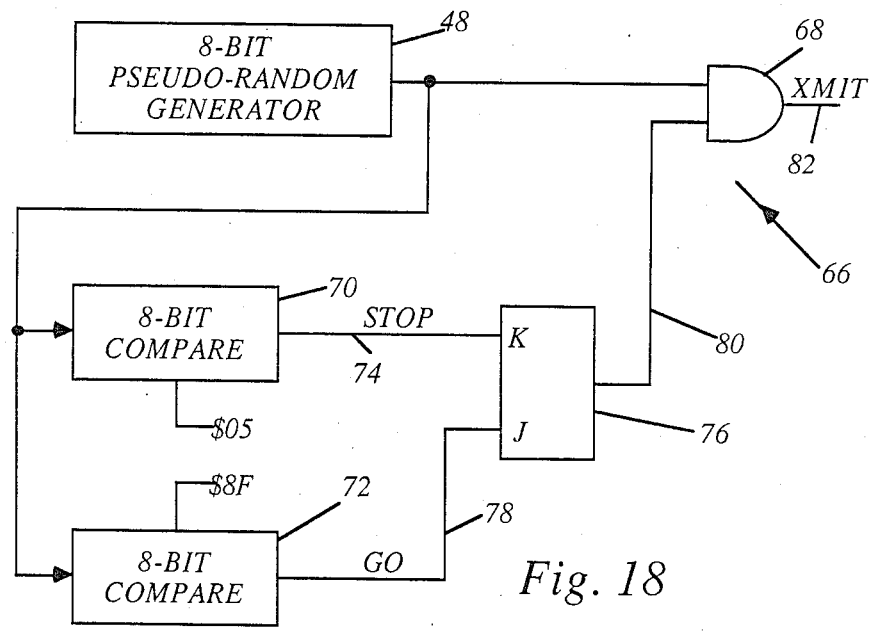
FIG. 18 is a drawing showing the manner in which the gap is created in the transmission from the reference node during synchronization.
Figure 19:
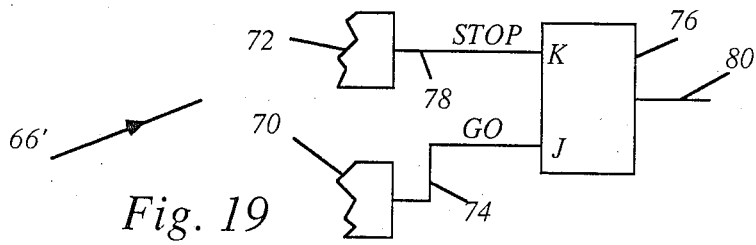
FIG. 19 is a drawing showing the manner in which from the slave node during synchronization.

Turning now to FIGS. 18 and 19, the manner in which the gap 36 and portion 38 are created in the preferred embodiment will now be discussed. The output control circuit 66 of the reference node 26 is shown in FIG. 18. Assume that the pseudo random generator 48 is generating a sequence such as that shown in part in Table 1.

TABLE 1

| STATE | BIT 8765 4321 | HEXADECIMAL |
|---|---|---|
| 1 | 0000 0001 | |
| 2 | 0000 0010 | |
| 3 | 0000 0101 | $05 |
| 4 | 0000 1011 | |
| 5 | 0001 0110 | $16 |
| 6 | 0010 1100 | |
| 7 | 0101 1000 | |
| 8 | 1011 0001 | |
| 9 | 0110 0011 | |
| 10 | 1100 0111 | |
| 11 | 1000 1111 | $8F |
| 12 | 0001 1110 | |
| 13 | 0011 1101 | |

The signal on output line 40 is input as one input of AND gate 68 and also input to the two compare circuits 70 and 72. Compare circuit 70 has a fixed input of $05 hexadecimal and its output 74 is connected to the K input of J-K flip-flop 76. In similar manner, compare circuit 72 has a fixed input of $8F hexadecimal and its output 78 is connected to the J input of the J-K flip-flop 76. The output 80 of the J-K flip-flop 76 is connected as the other input of the AND gate 68. The output 82 of the AND gate 68 is the signal which is transmitted. Thus, as will be appreciated from an inspection of the circuit 66, when the sequence gets to hexadecimal $05, the comparison will be equal in compare circuit 70 and a STOP signal will be input to the K input of flip-flop 76 causing its output to go to "0" and, in turn, stopping the signal on output line 82. When the sequence gets to hexadecimal $8F, the comparison will be equal in compare circuit 72 and a GO signal will be input to the J input of flip-flop 76 causing its output to go to "1" and, in turn, resuming the signal on output line 82. Thus, the gap 36 is created in the output on line 82. The control circuit 66' of the slave nodes is substantially identical except that the compare circuits 70, 72 input to the opposite J and K inputs of the flip-flop 76 as shown in the partial circuit diagram of FIG. 19. As a result, the circuit 66' causes the output line 82 from the AND gate 68 within the slave node 28 to transmit only during that portion of the sequence where there is no transmission by the reference node 26.

Figure 20:
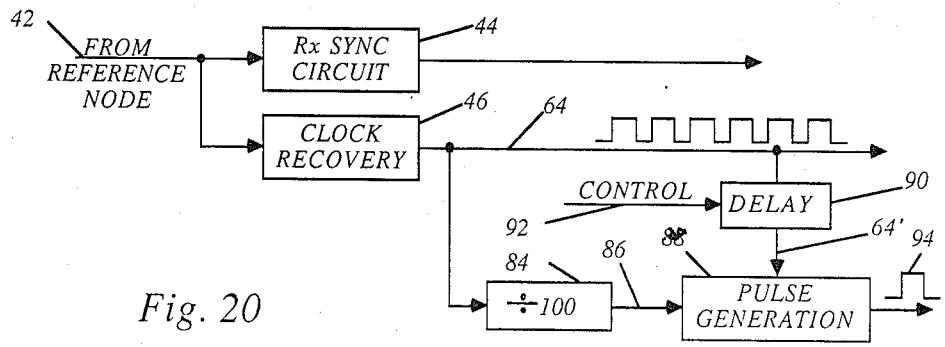
FIG. 20 is a drawing of the circuit used to perform final synchronization in the present invention.
Figure 21:
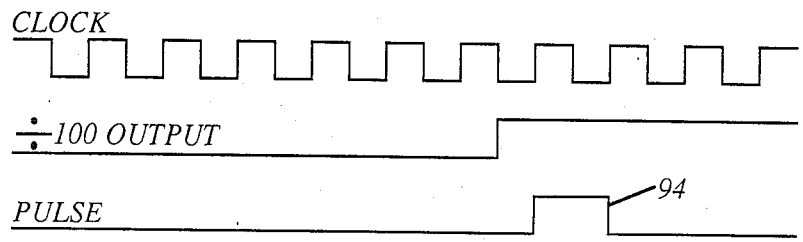
FIG. 21 is a drawing of the waveforms associated with the circuit of FIG. 20.

The manner in which final exact synchronization is achieved in the preferred embodiment as tested by the applicant will now be addressed with respect to FIGS. 20 and 21. While the procedure was accomplished manually (and could be also done in like manner in commercial applications since it is an infrequent procedure) it is anticipated that the procedure will ultimately be accomplished automatically. For this final synchronization purpose, the circuit of FIG. 20 is employed. The recovered clock on clock line 64 is also input to a divide by 100 circuit 84. The output 86 from the divide by 100 circuit 84 is input to pulse generation circuit 88. The clock to pulse generation circuit 88 (also used as the common clock throughout the slave node 28) is output on clock line 64' from a variable delay line 90 which inputs the clock line 64 and is controlled by input on line 92. As a result, the pulse generation circuit 88 adds a one clock cycle pulse 94 to the output signal every 100 pulses. This is shown in FIG. 21. As a result, the combined received signals 34' and 38' have a superimposed pulse riding on top every 100 bits. By displaying the combined received signals 34' and 38' on an oscilloscope (not shown) in a manner well known to those skilled in the art, the exact position of the portion 38' relative to the gap 36' can be adjusted (and the phase of the slave pulses simultaneously therewith) by adjusting the delay line 90 through control line 92, the clock within the slave node 28 can be adjusted by watching the display of the oscilloscope and exactly matching the rise and fall times of the pulses from the two signals.

Wherefore, having thus described my invention, I claim:

1. In a communications system wherein a plurality of nodes transmit over a common path on a time sharing basis, the method for permitting closer spacing of the communications from the nodes on the path comprising the steps of:
    (a) designating one of the nodes as the reference node and the remaining nodes as slave nodes;
    (b) beginning a transmission sequence by having the reference node transmit a repeating, pre-established, pseudo-random, digital sequence at a pre-established bit rate;
    (c) having the reference node continue its sequence while omitting a portion thereof between the start and end of the sequence;
    (d) having a slave node preparing join the transmission sequence begin the same repeating, pre-established, pseudo-random, digital sequence at approximately the same pre-established bit rate;
    (e) having the slave node transmit an approximation of the portion of the sequence being omitted by the reference node;
    (f) adjusting the bit rate, phasing, framing and sequence portion of the transmission from the slave node until the portion being transmitted thereby exactly matches the portion being omitted by the reference node whereby the reference node and slave node are placed in precise synchronization;
    (g) having the slave node inform the reference node that it is in synchronization and ready to begin normal message transmission; and,
    (h) beginning normal message transmission by the reference and slave nodes.

2. In a communications system wherein a plurality of nodes transmit over a common path on a time sharing basis, the improvement for permitting closer spacing of the communications from the nodes on the path comprising:
    (a) means for designating one of the nodes as the reference node and the remaining nodes as slave nodes;
    (b) means for beginning a transmission sequence by having said reference node transmit a repeating, pre-established, pseudo-random, digital sequence at a pre-established bit rate;
    (c) means for having said reference node continue its said sequence while omitting a portion thereof between the start and end of said sequence;

(d) means for having a slave node preparing to join said transmission sequence begin said same repeating, pre-established, pseudo-random, digital sequence at approximately the same pre-established bit rate;

(e) means for having said slave node transmit an approximation of said portion of said sequence being omitted by said reference node;

(f) means for adjusting the bit rate, phasing, framing and sequence portion of said transmission from said slave node until said portion being transmitted thereby exactly matches said portion being omitted by said reference node whereby said reference node and slave node are placed in precise synchronization; and, (g) means for having said slave node inform said reference node that it is in synchronization and ready to begin normal message transmission and for beginning normal message transmission by said reference and slave nodes.

3. In a communications system wherein a reference node and at least one slave node transmit simultaneously over a common path to at least one receiving node on a time sharing basis, the improvement for permitting closer spacing of the communications from the reference and slave nodes on the path comprising:

(a) means for causing the reference node to transmit a unique signal at the start of a transmission synchronization sequence;

(b) synchronization means for the slave node to monitor the transmission from the reference node and for adjusting the bit rate, phasing, framing and sequencing of the slave node until the reference node and slave node are placed in precise synchronization;

(c) means for informing the reference node that the slave node is in synchronization and for beginning normal transmission from the reference node; and, (d) means for beginning normal transmission from the slave node immediately following the end of the normal transmission from the reference node without a gap therebetween.

4. The improvement to a communications system of claim 3 wherein said synchronization means comprises:

(a) means for causing the reference node to continue its transmission of said unique signal while omitting a portion between the start and end thereof;

(b) means for having the slave node begin a same said unique signal at approximately the same pre-established bit rate;

(c) means for having the slave node transmit an approximation of said omitted portion of said unique signal;

(d) means for adjusting the bit rate, phasing, framing and sequence portion of said transmission from the slave node until said portion being transmitted thereby exactly matches said portion being omitted by said reference node whereby the reference node and the slave node are placed in precise synchronization.

5. The improvement to a communications system of claim 4 wherein:

said means for causing the reference node to transmit a unique signal and said means for having the slave node begin said same unique signal each include a pseudo random number generator generating the same pseudo random number sequence which is used as said unique signal.

6. The method of operating a communications system comprising a plurality of nodes transmitting over a common path on a time sharing basis to permit closer spacing of the communications from the nodes on the path comprising the steps of:

(a) designating one of the nodes as the reference node and the remaining nodes as slave nodes;

(b) beginning a transmission synchronization sequence by having the reference node begin transmission of a repeating, pre-established, pseudo-random, numerical digital sequence at a pre-established bit rate;

(c) continuing the transmission synchronization sequence by having the reference node continue its digital sequence while omitting a portion thereof between the start and end of the sequence comprising several digits of the sequence;

(d) having a slave node preparing to synchronize to the transmission sequence begin the same repeating, pre-established, pseudo-random, numerical digital sequence at approximately the same pre-established bit rate;

(e) having the slave node begin transmission of an approximation of the portion of the sequence being omitted by the reference node;

(f) adjusting the bit rate, phasing, framing and sequence portion of the transmission from the slave node until the portion being transmitted by the slave node exactly matches the portion being omitted by the reference node whereby the reference node and slave node are placed in precise synchronization;

(g) having the slave node inform the reference node that it is in synchronization and ready to begin normal message transmission; and, (h) beginning normal message transmission by the reference and slave nodes.

7. In a communications system wherein a reference node and at least one slave node transmit over a common path on a time sharing basis, the improvement for permitting closer spacing of the communications from the nodes on the path without delays therebetween comprising:

(a) the reference node including a first pseudo-random numerical sequence generator outputting a signal at an output thereof, means for switching the source of signal being transmitted by the reference node to said signal output from said first sequence generator, and means for selectively interrupting said signal from said first sequence generator at a pre-selected numerical sequential portion thereof;

(b) the slave node including a second pseudo-random numerical sequence generator functionally identical to said first pseudo-random numerical sequence generator and outputting a signal at an output thereof, means for switching the source of signal being transmitted by the slave node to said signal output from said second sequence generator, and means for selectively interrupting said signal from said second sequence generator during the time other than the time said preselected numerical sequential portion of said sequence is being interrupted by said reference node;

(c) synchronization means at the slave node for monitoring the transmissions from the slave node and the reference node and for adjusting the bit rate, phasing, framing and sequencing of the transmission from the slave node until the combined transmission signal from the reference node and slave node identically represents said sequence of said first and second signal generators without interruption whereby the reference node and slave node are placed in precise synchronization;

(d) means at the slave node for informing the reference node that the slave node is in synchronization and for switcing to normal transmission from the reference node and the slave node; and, (e) means for causing the slave mode to begin its normal transmissions immediately following the end of the transmission from the preceeding node without a delay therebetween.

8. The method of operating a communications system comprising a reference node and at least one slave node transmitting simultaneously over a common path to at least one receiving node on a time sharing basis to permit closer spacing of the communications from reference and slave the nodes on the path comprising the steps of:

(a) causing the reference node to transmit a unique signal at the start of a transmission synchronization sequence;

(b) causing the slave node to monitor the transmission from the reference node;

(c) causing the slave node to adjust its bit rate, phasing, framing and sequencing until the reference node and slave node are placed in precise synchronization;

(d) informing the reference,, node, that the slave node is in synchronization and thereafter beginning normal transmission from the reference node; and, (e) beginning normal transmissions from the slave node immediately following the end of the normal transmissions from the reference node without a gap therebetween.

9. The method of claim 8 and additionally including the steps of:

(a) causing the reference node to continue its transmission of the unique signal while omitting a portion between the start and end thereof;

(b) having the slave node begin generating the same unique signal at approximately the same pre-established bit rate;

(c) having the slave node begin transmission of an approximation of the omitted portion of the unique signal;

(d) adjusting the bit rate, phasing, framing and sequence portion of the transmission from the slave node until the portion being transmitted thereby exactly matches the portion being omitted by the reference node whereby the reference node and the slave node are placed in precise synchronization.

10. The method of claim 9 including the step of:

causing the reference node and the slave node to generate the same pseudo random number sequence which is used as the unique signal.

* * * * *